Dec. 10, 1935.   T. L. FAWICK   2,023,674
BRAKE
Filed March 25, 1932   5 Sheets-Sheet 1
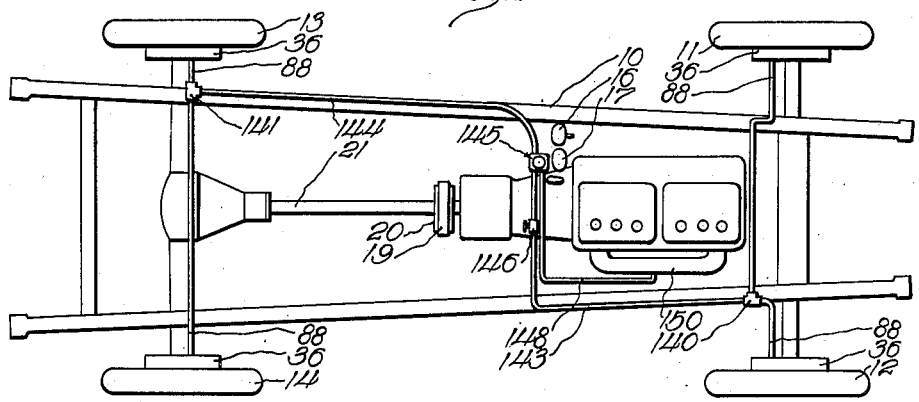
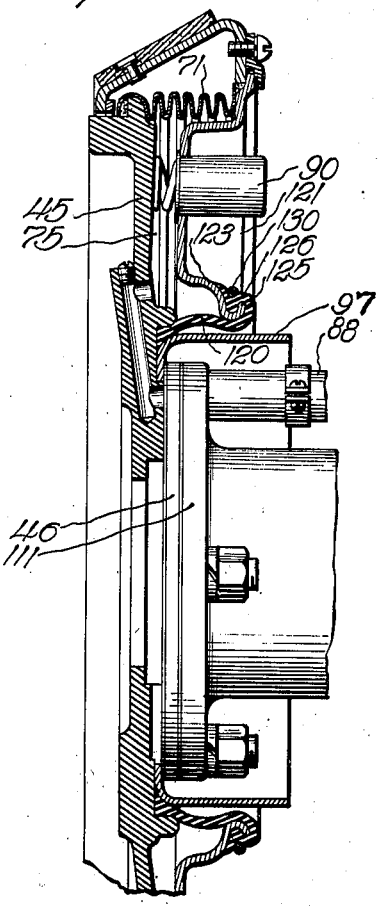
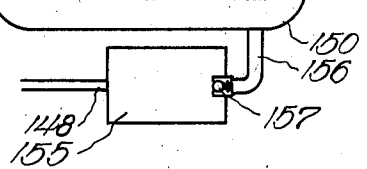
Inventor:
Thomas L. Fawick

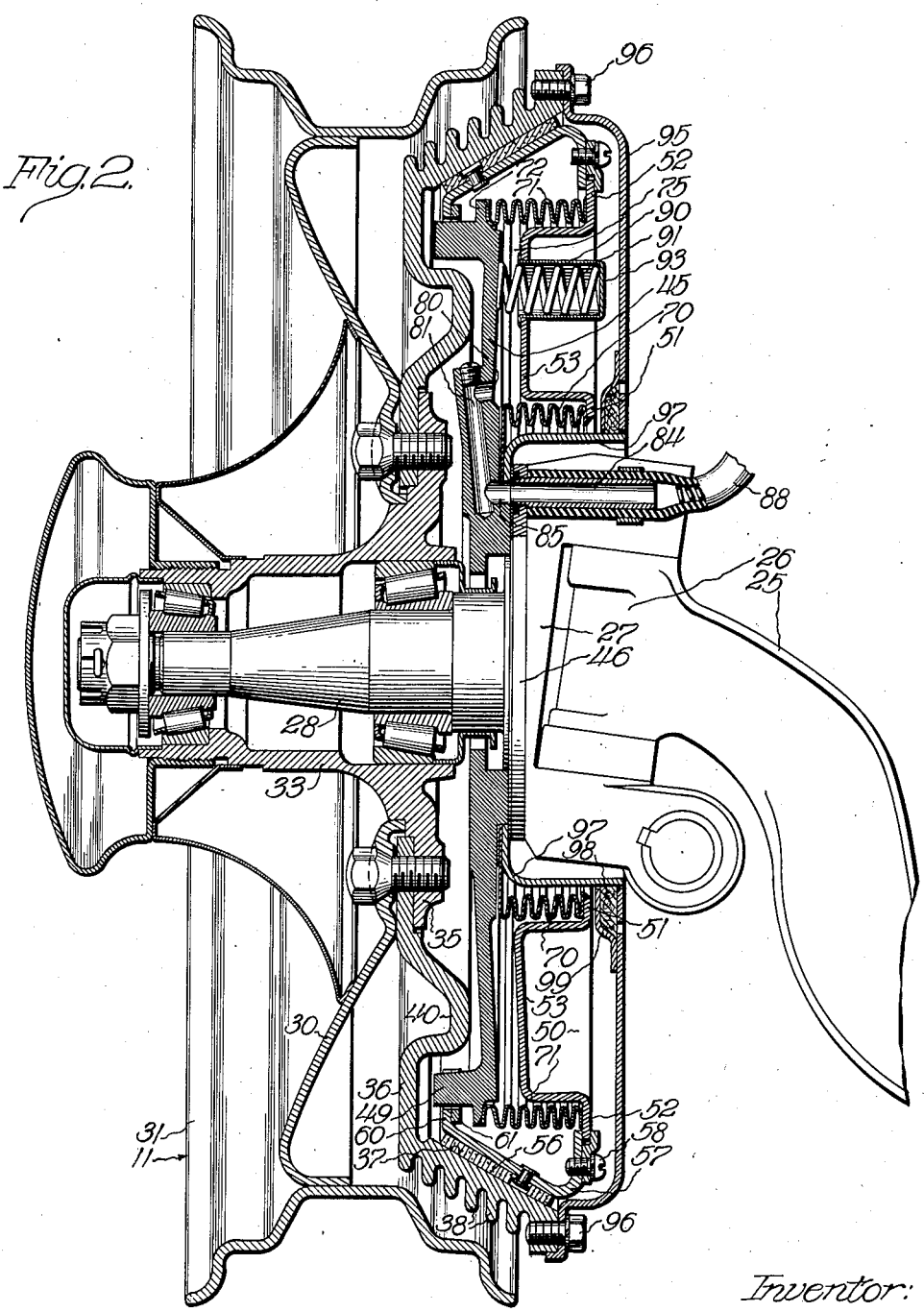

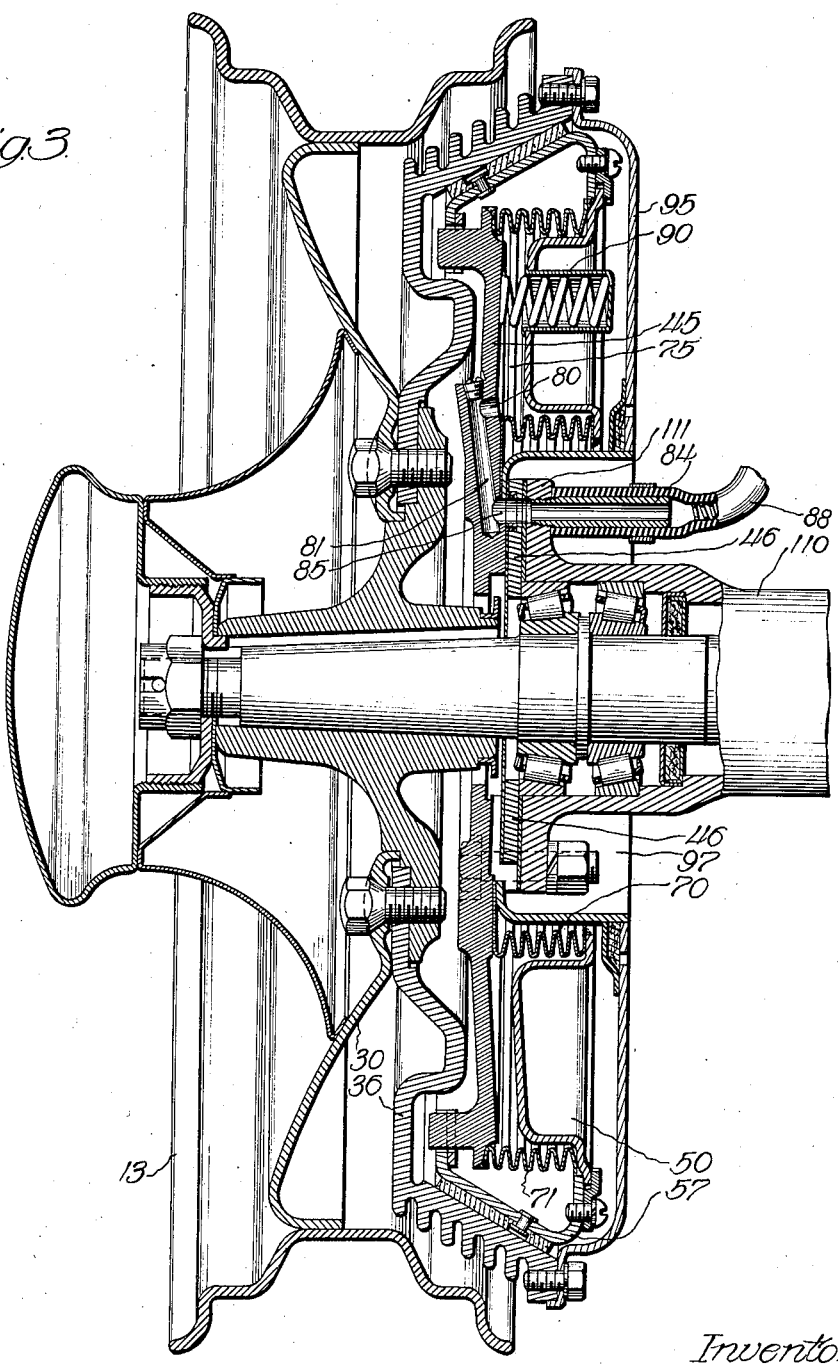

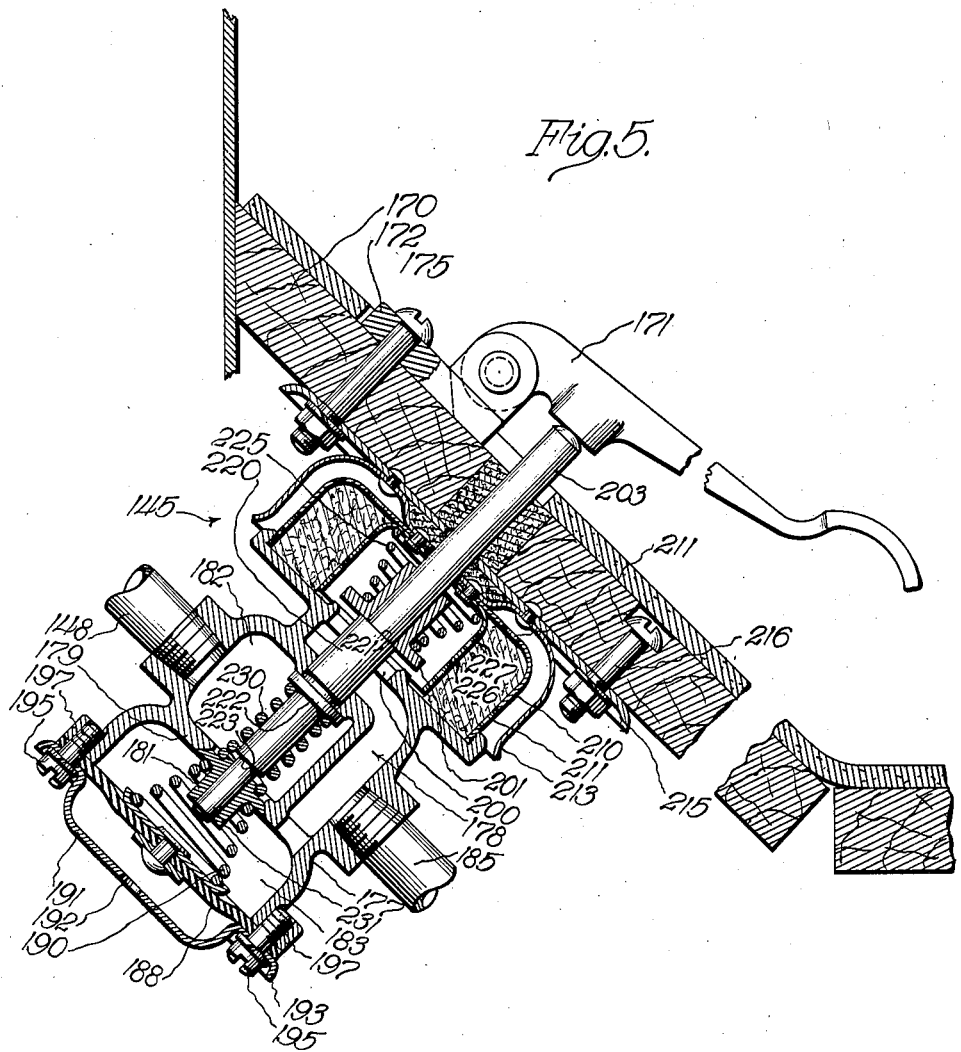

Dec. 10, 1935.  T. L. FAWICK  2,023,674
BRAKE
Filed March 25, 1932   5 Sheets-Sheet 5

Inventor:
Thomas L. Fawick

Patented Dec. 10, 1935

2,023,674

UNITED STATES PATENT OFFICE 2,023,674

BRAKE

Thomas L. Fawick, Akron, Ohio

Application March 25, 1932, Serial No. 601,119

13 Claims. (Cl. 188—71)

The present invention relates generally to braking systems and more particularly to fluid braking systems wherein fluid pressures are employed in providing the necessary brake applying forces.

More specifically, it is the principal purpose of the present invention to provide a suction operated braking system, particularly for automobiles, wherein a source of suction is applied to braking means by optionally operated valve means under the control of the operator. By an arrangement of this sort large and heavy vehicles may be brought to a stop without the expenditure of unnecessary amounts of energy on the part of the operator.

Briefly, the present invention contemplates a new and improved form of suction operated brakes, preferably one for each wheel of the automobile, all of the brakes being connected by suitable conduit means with a source of suction, such as the intake manifold of the automobile motor, a vacuum chamber or reservoir connected with either the intake manifold or with some other source of suction, or a vacuum pump.

Another important object of the present invention is the provision of new and improved valve means controlling the application of suction to the braking means, which valve means is so constructed and arranged that the force required to operate the valve, although small, is proportional to the force applied to the brakes, whereby the operator controls the braking system in a manner which simulates the operation of the regular or standard driver-controlled brakes, thereby giving the right "feel" to the braking system to make it operate like a regular braking system but with greater ease.

Other objects and advantages of the present invention will be apparent to those skilled in the art after a consideration of the following detailed description of the preferred structure, taken in conjunction with the accompanying drawings, in which:

Figure 1 is a plan view illustrating the application of the present invention to an automobile;

Figure 2 is a vertical sectional view taken through the front wheel of the automobile and showing in detail the various features of the suction operated brake for that wheel;

Figure 3 is a vertical sectional view taken through one of the rear wheels of the automobile;

Figure 4 is a vertical sectional view illustrating in fragmentary form a modified suction operated brake;

Figures 5 and 6 illustrate forms of valves controlling the application of suction to the braking means and which are so constructed and arranged as to give the proper "feel" when the suction brakes are actuated;

Figure 8 is a second form of locking means for the brake pedal, this locking means being associated with the control valve for the suction operated means so that the operation of the latter automatically releases the locking means of the parking or emergency brake; and Figure 9 illustrates the use of a vacuum storage tank as a source of suction.

Figure 6:
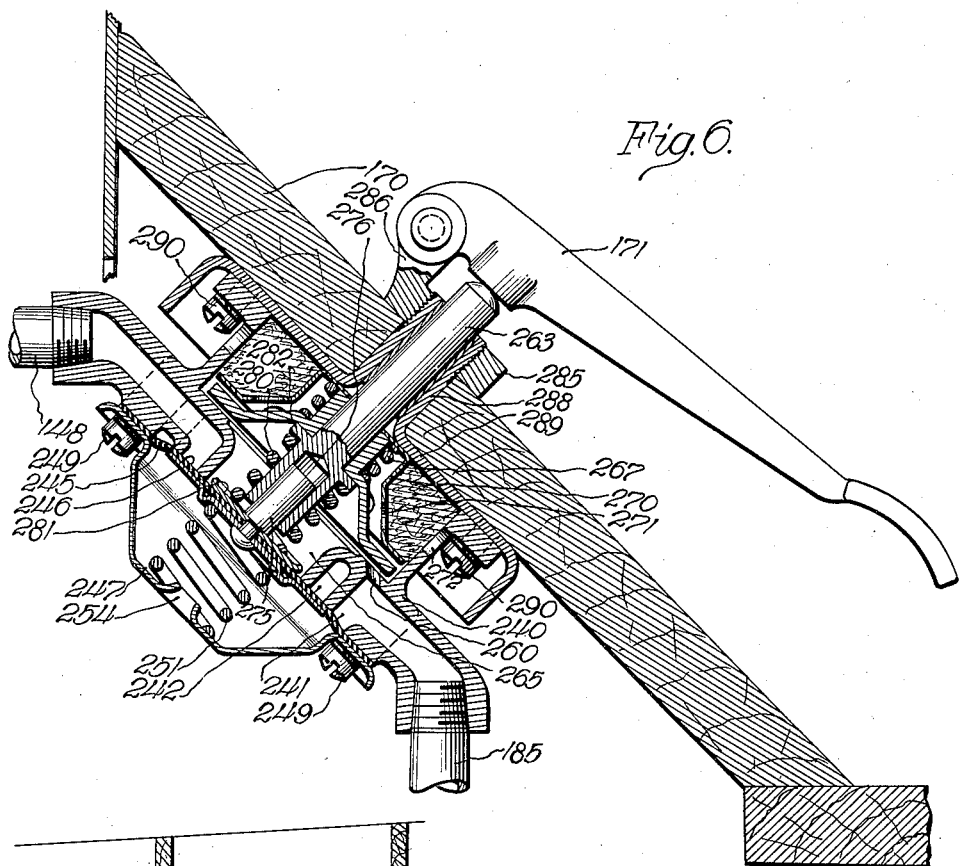

Referring now to the drawings, the reference numeral 10 indicates the frame of the automobile, which is equipped with front wheels 11 and 12 and rear wheels 13 and 14. The automobile is also equipped with the usual clutch pedal 16 and a brake pedal 17 arranged, as will be explained later in detail, as an emergency or parking brake, the brake pedal 17 controlling the application of a brake 19 cooperating with a brake drum 20 fixedly secured to the propeller shaft 21 of the automobile. Obviously, of course, the brake pedal 17 may be arranged to control brakes on the front or rear wheels, or both.

Turning now to Figure 2, which is a detail of the suction operated braking means for the left hand front wheel 11 of the automobile, the reference numeral 25 indicates the front axle having a yoke piece 26 on which is mounted the steering knuckle 27 with its steering spindle 28 on which the wheel 11 is journaled for rotation. The wheel 11, as illustrated, comprises a wheel body 30 equipped with a rim 31 and detachably bolted to a wheel hub 33 which is journaled by suitable bearings on the steering knuckle spindle 28. To facilitate mounting the wheel body 30 on the hub 33 the latter is provided with a flange 35 to which is secured not only the wheel body 30 but a brake drum 36. The brake drum 36 is of the cast metal type and is provided with an interior conically formed braking surface 37 and exterior cooling ribs 38. The brake drum 36 is also provided with a centrally disposed, laterally inwardly directed portion 40. This portion is provided so that the hub 33 and the brake drum 40 may be employed with wire wheels, in which case the portion 40 accommodates the laterally inwardly directed flange of the demountable hub to which the inner ends of the wire spokes are connected.

A stationary disc or plate 45 is fixedly mounted on the steering knuckle 27 and forms, in effect, a stationary support carried by the axle 25 to which suitable brake shoe means may be connected. In the preferred embodiment the stationary support 45 is bolted or otherwise secured to the steering spindle 27, there being a plate 46 interposed between the stationary support 45 and the steering spindle 27, with suitable gasket means to provide a firm seat therefor. The plate 46 includes an outer flange portion 49 which is extended in a laterally outer direction so as to substantially embrace the inwardly directed portion 40 of the brake drum, whereby the stationary supporting plate 45 as a whole is disposed in the general plane of the braking surface 37. This is primarily for the purpose of providing a simple and compact braking structure for the automobile wheels.

The brake shoe means is indicated as a whole by the reference numeral 50. The brake shoe 50 is generally annular in form and is disposed concentric with respect to the axis of rotation of the wheel and of the brake drum 36. The body portion of the brake shoe 50 comprises a radially inwardly directed flange 51 and a radially outwardly directed flange portion 52 with a central depressed portion 53 extending in a laterally outer direction so as to lie closely adjacent to the general plane of the stationary support 45. The active or frictional braking surface, like the braking surface 37 on the brake drum 36, is of conical formation and includes a conventional form of brake lining 56 secured to a conical ring member 57, one edge of which is secured, as at 58, to the radially outer flange 52 while the other edge 60 carries a slotted ring 61 adapted to engage over suitable projections carried by the flange 49 of the stationary plate 45, whereby relative rotation between the stationary support and the brake shoe structure is effectively prevented while permitting the necessary axial movement of the brake shoe in applying the brake. The ring member 57, actually the brake shoe proper, may be formed as a continuous ring, or the same may be formed of a plurality of interconnected sections.

For moving the brake shoe structure 50 toward the brake drum 36 to stop or retard the rotation of the wheel 11, the present invention contemplates the provision of suction or vacuum means for actuating the brake shoe means. To provide for this construction an annular flexible wall structure in the nature of a bellows diaphragm 70 is connected between the radially inner flange 51 and the stationary support 45, the bellows 70 being sealed to the brake shoe 50 and to the stationary support 45 in any manner desired, as by welding, spinning or the like. A similar bellows 71 is connected between the radially outer flange 52 of the brake shoe structure and the stationary support 45, also being sealed thereto in any desired manner. For example, the bellows 71 may be soldered to the flange 52 on the brake shoe structure, while the stationary support 45 may be provided with a small radially outwardly extending flange 72 to which the adjacent edge of the bellows 71 may be connected, either by soldering or by spinning a ring about the flange and the associated edge of the bellows 71, or any other equivalent means. As best shown in Figure 2, the connection 58 between the flange portion 52 and the brake shoe 57 is such that a limited amount of relative movement therebetween is accommodated. This is for the purpose of taking care of any backward or forward motion of the brake shoe relative to its support 45, which may be due to wear between the anchor lugs 49 and the slotted portion 61 of the brake shoe or other causes, and which arises from backward or forward motion of the car with the brake set. If this relative movement, although slight, were imposed on the flexible diaphragms 70 and 71, such rocking action might cause the latter to fail. Since the diaphragms 70 and 71 are flexible, the brake shoe is supported in its axial movement upon the lugs 49.

Preferably, the radially inner and outer bellows 70 and 71 are of the corrugated metal type so as to provide for the necessary axial movement of the brake shoe 50 while defining or establishing in connection therewith and with the stationary support 45 a vacuum or suction chamber 75 which is hermetically sealed and which, when subjected to suction of sufficient degree, is operable to force the brake shoe 50 into frictional contact with the brake drum 36 to stop the rotation of the wheel 11. The required evacuation of the suction chamber 75 may be accomplished in any manner desired. Preferably, however, the stationary support 45 is provided with a small bore 80 communicating with the chamber 75 and with a generally radially extending bore 81 with which a fitting 84 communicates through a third bore 85. The gasket mentioned above in connection with the plate 46 serves to prevent any loss of vacuum at the point where the fitting 84 communicates with the bore 85. The fitting 84 may be threaded into the plate 46 or, if desired, the fitting 84 may be threaded directly into the bore 85 in the supporting plate 45. A conduit 88 is connected with the fitting 84 and leads to a source of suction such as the intake manifold of the automobile motor, a suction chamber, a vacuum pump, or any other equivalent means.

The central depressed portions 53 of the brake shoe structure 50 is provided with sleeves 90 which enclose springs 91 biased between the supporting member 45 and the closed ends 93 of the sleeves to resiliently move the brake shoe away from the brake drum when the suction in the chamber 75 is relieved. The depressed portions 53 serve an important function in diminishing the volumetric capacity of the suction chamber 75 while not materially restricting the surface, whereby a relatively small degree of suction will apply sufficient braking force to effectively stop the vehicle. Further, the provision of a compact brake structure is by virtue of this construction more easily accomplished.

In order to protect the brakes, and particularly the flexible wall structures, a disc 95 is secured, as by set screws 96, to the brake drum 36. The disc 95 extends radially inwardly to a point closely adjacent a centrally disposed cup member 97 secured to the stationary member 45 in any manner desired. To provide for a leak-tight joint between the disc 95, which rotates with the brake drum 36, and the stationary cup member 97, the disc 95 carries at its radial inner edge packing means 98 fastened in place by a circular strip 99 or by any other equivalent means.

The rear wheel construction illustrated in Figure 3 is, as far as the brake details are concerned, substantially identical with that described above, therefore the same reference numerals have been assigned to Figure 3 for all of the parts which are identical. It will be noted, however, that in Figure 3 the rear axle, designated by the reference numeral 110, has a flange 111 at its outer end into which the fitting 84 is threaded, there being apertures registering with the fitting 84 and disposed in the plate 46 and the associated gaskets, whereby the fitting 84 in Figure 3 communicates with the bores 85, 81 and 80, respectively, and suction may be applied to the suction chamber 75 of the braking means for the rear wheels.

The illustrated constructions are preferred because practically all of the parts comprising the braking system are identical for the several wheels, whether they be front wheels or rear wheels. Where desirable, of course, the braking means for the rear wheels may be particularly adapted to be associated with the rear axle construction, in which case there may be slight differences between the braking means for the rear wheels and the braking means for the front wheels.

Figure 4 is a fragmentary view illustrating a slightly different form of braking means in which the outer flexible wall structure or diaphragm is in the form of a bellows having corrugations the same as the bellows structure indicated in Figures 2 and 3 by the reference numeral 71. However, as regards the radially inner flexible wall structure, the form illustrated in Figure 4 is that of a flexible strip of material, such as rubber or the like, this strip being indicated in Figure 4 by the reference numeral 120. The brake shoe 121 is practically identical with the brake shoe 50 shown in Figures 2 and 3 with the exception of the radially inner flange 123, which is of somewhat different formation. This flange has a turned edge 125 over which one edge 126 of the rubber strip is received and secured, as by a clamping member 130. When the latter is in place the edge of the rubber strip 120 is hermetically sealed to the brake shoe structure 121.

The opposite edge of the flexible strip 120 is fastened to the stationary member 45 by being received between the cup member 97 and the stationary support when the latter is bolted to the flange 111 of the rear axle housing. In this connection it is to be noted that the provision of the plate 46 between the stationary support 45 and the axle, either the front axle or the rear axle, serves to hold the cup member 97 in place and this feature is taken advantage of, as described, in effectively sealing the inner edge of the strip 120 to the stationary support 45.

Turning now to Figure 1 it will be observed that the conduit means 88 for the front wheels are connected to a T 140 and that the conduit means 88 from the rear braking means are connected to a T 141. The fittings 140 and 141 are connected, respectively, by conduits 143 and 144 with a valve structure indicated generally in Figure 1 by the reference numeral 145. If desired a shut-off valve 146 may be inserted in the suction line 143 to prevent operation of the front wheel brakes where only rear brakes are preferred. Associated with the valve 145 is a conduit 148 which leads from the valve 145 to the intake manifold 150 of the automobile motor. Instead, however, of leading directly to the intake manifold 150 the conduit 148 may be connected with a vacuum storage tank 155, see Figure 9, or a vacuum pump which, in turn, is connected with the intake manifold 150 through a pipe 156 and a check valve 157 arranged to permit air to be drawn into the intake manifold but which would prevent the passage of air from the intake manifold into the vacuum chamber 155.

One form of the control valve 145 is illustrated in detail in Figure 5. The reference numeral 170 indicates the floor board of the automobile and 171 is a pivoted control member in the form of a foot pedal pivotally mounted on a supporting bracket 172 in any desired manner, as by a bolt 175, to the floor board 170. The valve housing or valve body is indicated by the reference numeral 177 and encloses a valve chamber 178 divided into two portions by a central wall 179. This wall is apertured to provide a valve port adapted to be closed by a valve closure 181. The two portions of the valve chamber are indicated by the reference numerals 182 and 183, and the suction line 148 from the intake manifold 150 or from the storage chamber 155 opens into the suction chamber 182, while the suction lines 143 and 144 to the front and rear braking means communicate with the other portion 182 of the valve chamber 178 through a pipe 185.

One side of the valve chamber 178 is closed by a flexible diaphragm 188 sealed in any manner desired to the valve body 177. This diaphragm is connected with the suction valve closure 181 through a spring 190. One method of sealing the diaphragm 188, which preferably takes the form of a rubber disc or the equivalent, is by means of a plate or cap 191 having an air vent 192 and a flange portion 193 provided with suitable apertures through which set screws 195 may be passed and which may be threaded into suitable bosses 197 on the valve body or valve housing 177.

An air vent 200 is formed in the valve housing in communication with the valve chamber 178 so that the braking means can be vented to the atmosphere whenever the brakes are not applied. This air vent 200 is controlled by means of an air valve 201 having a free sliding fit on the upper end of a valve stem 203. This valve stem is slidably mounted in the valve housing 177 and has its upper end projecting through the floor boards 170 of the automobile and in a position to be engaged by the foot pedal 171.

The upper end of the housing 177 is threaded onto an apertured cap member 210 having apertures 211 and riveted to a second cap member 213 which, in turn, is secured as by riveting or the like to a base plate 215, bolted to the under side of the floor boards 170. For this purpose the bolt 175 is utilized and a second bolt 216 cooperates therewith to secure the members and the valve housing in place on the under side of the floor boards 170.

The valve stem 203 has a bushing 220 or is formed with an integral enlargement to provide shoulders 221 and 222. The air valve 201 is adapted to abut against the shoulder 221, which faces upwardly, the valve 201 being yieldingly maintained in that position by a spring 225 tensioned between the valve 201 and the upper part of the interior cap member 210. A sleeve 226 having apertures 227 surrounds the spring, and oil-soaked hair, felt or the like, acting as a filter or cleaner, is disposed between the sleeve 226 and the apertured cap 210. By virtue of this construction air may freely pass into the valve chamber 178 and is cleaned by being drawn through the air filter.

A spring 230 is disposed between the shoulder 222 and one side of the suction valve 181. The latter valve also has a free sliding fit on the lower reduced end 231 of the valve stem 203. It will be noted that the shoulder 223 formed at the lower reduced end of the valve stem does not contact with the valve 181 but is spaced therefrom a certain distance.

The operation of the above described valve structure is substantially as follows: When the pedal 171 is depressed by the operator, the valve stem 203 is moved downwardly. This moves the shoulder 221 downwardly, which allows the spring 225 to move the air valve 201 to its seat to close off communication between the atmosphere and the valve chamber through the air vent 200. This downward movement of the valve stem 203 also moves the shoulder 222 downwardly, which compresses the suction valve operating spring 230. The compression of this spring moves the suction valve 181 slightly off its seat, whereupon the suction from the manifold 150 or from the vacuum chamber 155 is communicated through the open port into the valve chamber portion 183, the connection 185, and the suction lines 143 and 144, whereby the application of the brakes is effected. It will be noted, however, that before the air valve 201 was closed the chamber portion 183 was subjected to atmospheric pressure and that one side of the flexible diaphragm 188 was also subjected to atmospheric pressure, the other side of the flexible diaphragm being also subjected to atmospheric pressure through the air vent 192. However, as soon as the air valve 201 is closed and the suction valve 181 opened, suction is built up in the chamber 183 and the suction lines in communication therewith, so that now there is a pressure differential existing on opposite sides of the flexible diaphragm 188. This pressure difference causes the diaphragm 188 to compress the spring 190 which is sufficient to bias the valve 181 and cause the same to close against the force of the spring 230. Thus, even though the pedal 171 has been depressed slightly to initially open the valve 181 to set the brakes, the building up of the suction causes the suction valve 181 to close so that the brakes will not then be set any further. If, however, greater braking effort is needed the pedal 171 is depressed further, putting the spring 230 under greater compression, which then opens the valve 181, thus subjecting the chamber 183 and the suction lines to greater suction. If the compression of the spring 230 is not too great the building up of additional suction will again cause the diaphragm 188 to close the suction valve 181 so that the brakes will again not be set harder than desired, but will be held applied as long as the pedal 171 is held down far enough to keep the air valve 201 closed. If full braking power is desired, the pedal 171 may be further depressed until the shoulder 223 contacts with the suction valve 181 and positively opens the same and holds the same open. As soon as need for braking is no longer present the pedal 171 is released, which then moves to its upper position and the shoulder 221 will lift the air valve 201 off its seat, thus venting the braking system to atmospheric pressure and releasing the brakes as described above.

An important feature to be noted in connection with the above described valve is that the suction valve 181 is of relatively small diameter so that a relatively small pressure is all that is required to open the same. Since under most conditions the spring 230 is compressed at various degrees to give the various degrees of braking effort, the "feel" of this brake control means is substantially the same as a conventional driver-operated brake, that is, a greater pressure is necessary where greater braking effort is required.

Figure 7:
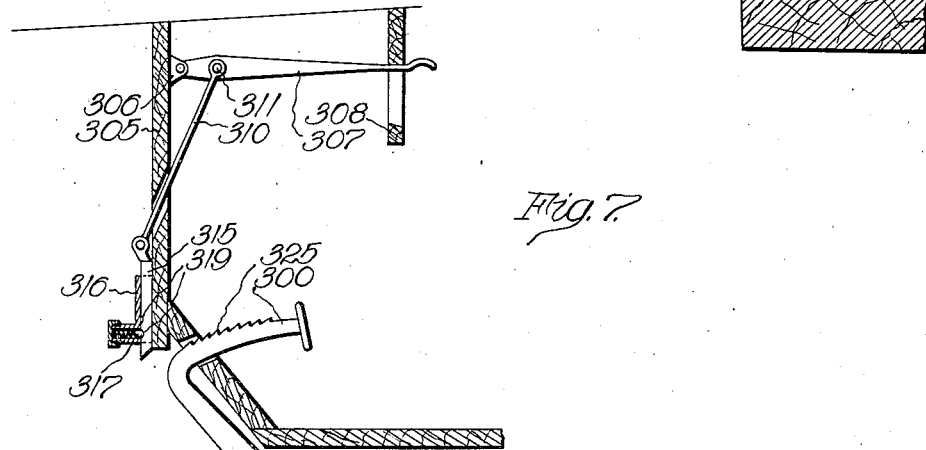
Figure 7 illustrates one form of locking means associated with the brake pedal of an automobile for holding the brake controlled by that pedal in locking position, whereby the brake may be used as a parking or emergency brake.

A second form of suction control valve is illustrated in Figure 6. This form of valve is somewhat simpler and more compact than the valve means just described. In Figure 7 the reference numeral 240 indicates a valve housing or valve body which encloses a valve chamber 241 into which a generally circular suction port 242 opens, the suction port communicating with the suction line 148 leading to the intake manifold 150 or a vacuum storage chamber 155, see Figure 9. The valve chamber 241 communicates with the connection 185 and one side of the valve chamber 241 is closed by a flexible diaphragm 245 similar to the diaphragm 188 illustrated in Figure 5. However, where in Figure 5 a separate valve closure 181 was described, in Figure 6 the suction valve closure is supplied by the diaphragm 245 itself seating against the circular suction port 242, as indicated by the reference numeral 246. A closure cap 247 is secured to the valve housing 240 by means of cap screws 249 and a spring 251 is confined between the cap 247 and the diaphragm 245. The cap 247 also includes an air vent 254 whereby one side of the diaphragm is subjected to atmospheric pressure at all times.

As in the case of Figure 5, the connection 185 and the lines 143 and 144 leading to the suction operated brakes are subjected to atmospheric pressure whenever the brakes are not applied. For this purpose the valve chamber 241 is provided with an air vent 260 which is adapted to be closed by a valve closure 261 mounted for free sliding movement on a valve stem 263 movably mounted in the valve housing 240. The valve closure 261 is of the disc type and when the stem 263 is depressed not only closes the air vent 260 but also closes off the portion 265 of the valve chamber which is defined partly by a portion of the flexible diaphragm 245.

The air valve 261 is provided with a spring 267 biased between the valve closure 261 and a cup member 270 having apertures 271 through which air may pass. The upper portion of the valve housing 240 is provided with suitable air intake passages or vents 272, and oil-soaked hair or equivalent means is disposed in this portion of the housing and held in place by the cup member 270 so that all air passing into the valve housing 240 is cleaned.

The valve stem 263 does not connect directly with the diaphragm 245 which, as indicated above, serves as the suction valve closure. The diaphragm 245 carries a central stud 275 which has a free sliding fit in an interior bore 276 in the stem. The lower end of the stem clears the diaphragm 245 by a certain distance and a spring 280 is confined between a plate 281 carried by the diaphragm 245 and a shoulder 282 formed on the valve stem itself. This suction valve operating spring 280 serves the same purpose as the valve operating spring 230 described above in connection with the form shown in Figure 5.

The pedal 171 in Figure 6 is pivoted to a collar 285 having a pair of apertured ears 286 to receive one end of the pedal. This collar 285 is threaded onto the upper end of the tubular stem 288 forming a part of a supporting plate 289 to which the upper end of the valve housing 240 is connected, as by cap screws 290.

The operation of the valve means shown in Figure 6 is substantially identical with the operation of the valve means shown in Figure 5.

When the pedal 171 is depressed the valve stem 263 with its shoulder or flange 282 moves downwardly and causes the spring 267 to first close off the air vent 260 and the portion 265 on one side of the diaphragm 245 from the atmosphere. Further movement of the valve stem 263 compresses the valve operating spring 230 an amount sufficient to cause it to move the diaphragm 245 away from the suction port 242, whereby suction is then communicated to the lines leading to the braking means. This puts the chamber 265 under a lowered pressure so that the atmospheric pressure acting on the other side of the diaphragm 245 causes the diaphragm to close off the suction port 242 against the force of the spring 280, just as described in the modification shown in Figure 5. Thus, the brakes will not be set harder unless the spring 280 is further compressed to apply greater suction to the braking means. After the spring 280 has been fully compressed the upper end of the stud 275 is contacted by the end of the bore 276 so that further pressure on the pedal 171 positively opens and holds open the port 242 whereby full braking effort is obtained. As in the modification shown in Figure 5, the greater the braking effort required, the greater the pressure required to be exerted through the stem 263. Thus the proper "feel" is obtained.

Obviously, of course, while I have shown a pivoted brake pedal 171, if desired the upper end of the stem 263 may be provided or formed with a suitable head so as to be operated directly. In both of the above described valve means a compact arrangement is provided where the valve means is on one side of the floor boards of the automobile while the brake operating pedal is on the other, there being a single means for mounting both of these parts.

As an important feature of the invention embodied in the above described structure, the usual emergency brake lever may be entirely dispensed with. For example, the present invention proposes to utilize a brake pedal substantially identical with the conventional service brake pedal now in wide use in place of the usual hand lever, which generally is in the way. The use of a pedal in this location for an emergency or parking brake is made possible by the provision of ratchet or equivalent locking means for holding this brake pedal applied.

Referring now to Figure 7, I have illustrated such a construction, where the reference numeral 300 indicates a brake pedal of more or less conventional construction pivoted as at 301 to the frame of the vehicle and provided with an aperture 303 to receive a brake rod 304. The dash 305 of the automobile carries a bracket 306 to which is pivoted a hand lever 307 projecting outwardly through the instrument panel 308. An operating link 310 extends downwardly from the hand lever, being pivoted thereto as at 311. This operating link 310 is connected at its lower end with a slidable pawl 315 suitably mounted in a sleeve 316 fastened to the dash 305. A spring-pressed ball 317 is carried by the sleeve 316, the ball being adapted to be received in either of the recesses 319 formed in the pawl 315, whereby the pawl may be yieldingly held in either of two positions. One position is that shown in Figure 8, where the pawl 315 is disengaged from the shank of the brake pedal 300. When in this position the brake will be released as soon as pressure is removed therefrom. The other position of the pawl is one where the lower end thereof engages the ratchet teeth 325 formed on or secured to the brake pedal. The pawl 315 may be brought into engaging position by moving the lever 307 downwardly, whereby the pawl will engage one of the teeth 325 and hold the brake pedal 300 in any position to which it has been depressed. Thus the brake 300 may be used as a parking brake by depressing the same to apply the brake, then moving the lever 307 downwardly to engage the pawl 315 with the ratchet 325.

Figure 8 illustrates another method of arranging ratchet or other locking means for holding the parking brake pedal depressed. In this case the housing of the suction valve is secured to the frame 10 rather than to the floor boards 170, so as to allow the use of a longer valve stem 298. Also, the pedal 171 has been dispensed with and a simple button 299 secured to the upper end of the stem. The lower portion of the brake pedal 300 is formed as a ratchet 310 and suitably and pivotally mounted on the frame is a pawl 311 having a spring 312 causing the pawl to engage the ratchet 310 at all times. The spring 312 is secured to the pawl 311 and to some stationary part of the automobile, such as the frame 10 or the like. The upper end of the pawl 311 is bifurcated, as indicated at 315, and the valve stem 298 provided with a collar or pin 316 whereby the pawl 311 may be released by depressing the valve stem. Thus, in this form the locking means for the parking brake may be released by temporarily applying the suction operated service brakes by depressing the valve 298.

In both of the forms of my invention as described above, there is an important feature to which attention should be particularly directed. Where the vacuum chamber is disposed adjacent the brake drum, every time the brake is applied by exhausting some of the air from the chamber a certain amount of heat units are drawn away from the brake as the air is drawn away by the suction applied. The more the brake is applied the greater the heat, but at the same time the greater is the amount of air withdrawn and therefore the greater the amount of heat removed. When the brakes are released air at atmospheric temperature replaces the air withdrawn from the chamber.

These principles are also applicable to braking systems where fluid or fluids other than air may be utilized, or to closed fluid braking systems where the same fluid is exhausted from and subsequently returned to the braking means.

While I have described above the structure in which the present invention is preferably embodied, it is to be understood that, in fact, widely different means may be employed in the practice of the broader aspects of my invention. For example, where in Figure 9 I have indicated a vacuum storage tank connected with the intake manifold 150 of the engine it is to be understood that a vacuum pump or the equivalent may be employed if desired.

What I claim, therefore, and desire to secure by Letters Patent is:

1. In a fluid braking system, a rotatable member having a brake drum, a stationary support disposed adjacent said brake drum, a movable brake shoe adapted to engage said brake drum to apply braking force thereto and including portions disposed on opposite sides of said stationary support, flexible diaphragm means joining the portion of said movable brake shoe opposite said brake drum with said stationary member to establish therebetween a fluid chamber on the side of said stationary support opposite said brake drum, and means disposed radially inwardly of said flexible diaphragm means and providing for the evacuation of fluid from said chamber to move said brake shoe into frictional engagement with said brake drum.

2. In a fluid braking system, a rotatable member having a brake drum, a stationary support concentrically disposed with respect to the axis of rotation of said rotatable member, an axial movable concentric brake shoe adapted to be moved into engagement with said brake drum, flexible wall means joined to said stationary support and to one portion of said concentric brake shoe to define therebetween a fluid chamber, the other portion of said brake shoe being adapted to directly engage said brake drum and to rotate relative to said first portion, means anchoring said other portion of the brake shoe to the radially outer peripheral portions of said stationary support, and means operative through fluid pressure differences between the interior and exterior of said fluid chamber for moving said brake shoe against the brake drum.

3. In a fluid braking system, an axle, a wheel rotatably journaled thereon, a brake drum carried by said wheel and having a conical interior braking surface, a stationary plate secured to said axle and disposed adjacent and radially inwardly of the conical braking surface of said brake drum, an axially movable brake shoe having a conical friction surface adapted to be moved to contact with said conical brake drum and substantially embracing the peripheral portions of said stationary plate, said brake shoe being circular in formation and having radially inner and outer flanges at one side thereof with a centrally disposed depressed portion therebetween, radially inner and outer flexible wall structures connecting said flanges with said stationary plate to form an annular fluid chamber, said depressed portion of the brake shoe being disposed between said inner and outer flexible wall structures to diminish the volumetric capacity of said chamber, and means for varying the pressure of the fluid within said chamber for applying the brake.

4. In a fluid braking system, an axle, a wheel rotatably journaled thereon, a brake drum secured to said wheel, a circular stationary element connected with said axle and disposed adjacent said brake drum, a circular brake shoe having a friction surface engageable with said brake drum and radially inner and outer flanges with a concentric depressed portion therebetween, resilient wall structures connecting said radially inner and outer flanges with said stationary element to define a fluid chamber therebetween, a plurality of sleeves carried by said concentric depressed portion, spring means disposed in said sleeve and abutting against said stationary element to urge the brake shoe away from said brake drum, a source of suction, conduit means connected therewith and carried by said stationary element and communicating with the interior of said chamber to apply suction thereto to engage the brake, and valve means controlling the application of suction to said chamber.

5. In a braking system, a rotatable member having a brake drum, a stationary support, a cup-shaped member concentrically disposed with respect to the axis of rotation of said rotatable member and having a cylindrical section and a radially inwardly directed section connected with said stationary support, an enclosing cover secured to said drum and extending radially inwardly therefrom to a point closely adjacent the cylindrical portion of said cup-shaped member, and brake operating means carried by the stationary member radially inwardly of the outer diameter of said cup-shaped member and extending radially outwardly to a point between the stationary member and said brake drum.

6. In a fluid braking system, a rotatable member having a brake drum, a stationary support disposed adjacent said brake drum, a movable brake shoe adapted to engage said brake drum to apply braking force thereto and including portions surrounding the periphery and disposed on opposite sides of said stationary support, flexible diaphragm means joining the portion of said movable brake shoe opposite said brake drum with said stationary member to establish a fluid chamber on the side of said stationary support opposite said brake drum, means connecting the portion of said brake shoe adjacent the brake drum with the radially outer portions of said stationary support for movement relatively thereto, and means providing for the evacuation of fluid from said chamber to move said brake shoe into frictional engagement with said brake drum.

7. In a fluid braking system, a rotatable member having a brake drum, a stationary support disposed adjacent said brake drum, a movable brake shoe adapted to engage said brake drum to apply braking force thereto and including portions disposed on opposite sides of said stationary support, flexible diaphragm means joining the portion of said movable brake shoe opposite said brake drum with said stationary member to establish a fluid chamber on the side of said stationary support opposite said brake drum, lugs projecting from the other side of said stationary support adjacent the periphery thereof and opposite said fluid chamber, means anchoring the portion of said movable brake shoe adjacent the brake drum to said lugs, and means disposed radially inwardly of said flexible diaphragm means and providing for the evacuation of fluid from said chamber to move said brake shoe into frictional engagement with said brake drum.

8. In a fluid braking system, a fixed axle, a wheel rotatably journaled thereon, a brake drum having a radially inwardly disposed section connected to said wheel and a radially outer section having a conical interior braking surface, a stationary support carried by said axle and disposed adjacent the radially inwardly disposed section and having its peripheral portion spaced radially inwardly of the conical braking surface on the brake drum, a circular braking member arranged in embracing relation with respect to the peripheral portion of said stationary support in concentric relation with said brake drum and movable axially into braking engagement with the conical braking surface of said brake drum, said braking member including a radially inwardly directed flange arranged at one side of the stationary support opposite the radially inwardly directed section of said brake drum, flexible wall means connecting said flange with said stationary support to form a fluid chamber, conduit means carried by said stationary support inwardly of said flexible wall means and communicating with the interior of said chamber, a source of vacuum, and means controlling the application of vacuum to said chamber to control the application of the brake.

9. In a braking system, a rotatable member having a brake drum, a rigid stationary support, a brake shoe means adapted to be moved into frictional contact with said drum and having a radially outwardly disposed brake drum engaging section and a radially inwardly disposed section, flexible diaphragm means connected between the stationary support and the radially inwardly directed brake shoe section to establish a fluid chamber, separate means disposed substantially at the periphery of said brake shoe means outside of said fluid chamber and extending between the radially outwardly disposed brake drum engaging section of said brake shoe means and the radially outer portions of said stationary support for anchoring the brake shoe thereto while accommodating relative movement therebetween, and means acting through the fluid pressure in said chamber for causing said brake shoe to move into engagement with said brake drum to apply braking force thereto.

10. In a fluid braking system, a rotatable member having a brake drum, a stationary support disposed adjacent said brake drum, a movable brake shoe adapted to engage said brake drum to apply braking force thereto and including portions disposed on opposite sides of said stationary support, flexible diaphragm means disposed on one side of stationary support and connecting one of said oppositely disposed portions therewith to establish a fluid chamber on said one side of said stationary support, means on the other side of said stationary support adjacent the periphery thereof for anchoring said movable brake shoe to said stationary support, and means acting through the fluid pressure in said chamber to move said brake shoe into frictional engagement with said brake drum.

11. In a fluid braking system, a rotatable member having a brake drum, a stationary support disposed adjacent said brake drum, a movable brake shoe adapted to engage said brake drum to apply braking force thereto and including portions disposed on opposite sides of said stationary support, flexible diaphragm means joining the portion of said movable brake shoe opposite said brake drum with said stationary member to establish a fluid chamber on the side of said stationary support opposite said brake drum, means on the side of said stationary support adjacent the brake drum for anchoring said movable brake shoe to said stationary support, and means providing for the evacuation of fluid from said chamber to move said brake shoe into frictional engagement with said brake drum.

12. In a braking system, a rotatable member having a conical brake drum, a stationary support disposed adjacent said brake drum, a movable brake shoe having a conical braking surface adapted to engage said brake drum to apply braking force thereto and including radially inwardly directed portions disposed on opposite sides of said stationary support, means disposed on one side of said support and cooperating with one of said radially inwardly directed portions for anchoring said brake drum to said stationary support to transmit braking stresses thereto, and means on the other side of said stationary support and reacting thereagainst to move said brake shoe into frictional engagement with said brake drum.

13. In a braking system, a fixed axle, a wheel rotatably journaled thereon, a brake drum having a radially inwardly disposed section connected to said wheel and a radially outer section having a conical interior braking surface, a stationary support carried by said axle and disposed adjacent the radially inwardly disposed section and having its peripheral portion spaced radially inwardly of the conical braking surface on the brake drum, a circular braking member arranged in embracing relation with respect to the peripheral portion of said stationary support in concentric relation with said brake drum and movable axially into braking engagement with the conical braking surface of said brake drum, said braking member including a radially inwardly directed flange arranged at one side of the stationary support opposite the radially inwardly directed section of said brake drum, means acting against said flange and the stationary support at said one side for controlling the application of the brake, and means on the other side of said support and cooperating with the portion of said braking member opposite flange and generally radially outwardly thereof for anchoring said member to said stationary support.

THOMAS L. FAWICK.